(12) United States Patent
Villarreal et al.

(10) Patent No.: US 10,378,483 B2
(45) Date of Patent: Aug. 13, 2019

(54) AEROSPIKE ROCKET MOTOR ASSEMBLY

(71) Applicant: Raytheon Company, Waltham, MA (US)

(72) Inventors: James Kendall Villarreal, Tucson, AZ (US); Mark T. Langhenry, Tucson, AZ (US); Jeremy C. Danforth, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1005 days.

(21) Appl. No.: 14/938,952

(22) Filed: Nov. 12, 2015

(65) Prior Publication Data

US 2017/0138310 A1    May 18, 2017

(51) Int. Cl.
*F02K 9/97* (2006.01)
*F02K 9/90* (2006.01)
*F02K 9/10* (2006.01)
*F02K 9/34* (2006.01)
*F02K 9/24* (2006.01)
(Continued)

(52) U.S. Cl.
CPC .............. *F02K 9/97* (2013.01); *F02K 9/10* (2013.01); *F02K 9/18* (2013.01); *F02K 9/24* (2013.01); *F02K 9/34* (2013.01); *F02K 9/36* (2013.01); *F02K 9/90* (2013.01); *F02K 9/95* (2013.01); *F02K 9/978* (2013.01); *F41A 1/00* (2013.01); *F41F 3/04* (2013.01); *F41F 3/0413* (2013.01); *F42B 15/00* (2013.01); *F42B 15/01* (2013.01); *F42B 15/10* (2013.01); *F42B 15/105* (2013.01); *F42B 15/36* (2013.01); *F42B 30/08* (2013.01); *F42B 30/10* (2013.01); *F42B 30/12* (2013.01)

(58) Field of Classification Search
CPC ..... F02K 9/10; F02K 9/24; F02K 9/34; F02K 9/36; F02K 9/90; F02K 9/97; F02K 9/978; F42B 15/36; F42B 30/08; F42B 30/10; F42B 30/12; F42B 15/00
See application file for complete search history.

(56) References Cited

U.S. PATENT DOCUMENTS 3,358,453 A    12/1967  Swet
3,636,710 A *  1/1972  Lovingham ............... F02K 9/62
                                                           60/230

(Continued)

FOREIGN PATENT DOCUMENTS

DE       1526886 A1    12/1970
WO    2004099601 A2    11/2004
(Continued)

OTHER PUBLICATIONS

International Search Report and Written Opinion for corresponding Patent Applications No. PCT/US2016/038486 dated Oct. 6, 2016.

*Primary Examiner* — Carlos A Rivera
*Assistant Examiner* — Kyle Thomas
(74) *Attorney, Agent, or Firm* — Renner, Otto, Boisselle & Sklar, LLP

(57) ABSTRACT

A motor assembly is provided for use with projectiles, such as munitions, having relatively low length to diameter ratios. The motor assembly has an aerospike nozzle and a casing disposed about the aerospike nozzle, where interior aerospike volume contains propellant and where walls of both the cowl of the casing and of the aerospike nozzle jointly define a combustion chamber.

20 Claims, 6 Drawing Sheets

(51) Int. Cl.
*F02K 9/36* (2006.01)
*F42B 30/08* (2006.01)
*F42B 30/12* (2006.01)
*F42B 30/10* (2006.01)
*F02K 9/95* (2006.01)
*F42B 15/01* (2006.01)
*F42B 15/10* (2006.01)
*F42B 15/36* (2006.01)
*F02K 9/18* (2006.01)
*F41A 1/00* (2006.01)
*F42B 15/00* (2006.01)
*F41F 3/04* (2006.01)

(56) References Cited

U.S. PATENT DOCUMENTS

| | | | | |
|---|---|---|---|---|
| 3,806,064 A | * | 4/1974 | Parilla | F02K 9/80 244/169 |
| 3,903,804 A | * | 9/1975 | Luttrell | F42B 12/64 102/489 |
| 6,499,287 B1 | | 12/2002 | Taylor | |

FOREIGN PATENT DOCUMENTS

| WO | 2008123868 A2 | 10/2008 |
|---|---|---|
| WO | 2010034731 A1 | 4/2010 |

* cited by examiner

AEROSPIKE ROCKET MOTOR ASSEMBLY

FIELD OF THE INVENTION

The invention relates generally to a rocket motor assembly for propelling a projectile, such as a munition.

DESCRIPTION OF THE RELATED ART

A typical motor-propelled projectile includes a body and a motor having a nozzle for directing propellant gases being expelled from the motor. Such motors typically include a mass of propellant stored in a casing, a nozzle extending from the casing, and an empty combustion chamber disposed between the propellant and the nozzle. The combustion chamber serves as a space into which propellant gases formed from the combustion of the propellant may expand. The nozzle directs the propellant gases away from the motor, providing for propulsion of the associated projectile. The length of conventional motors, and particularly of the nozzles of conventional motors, is often not suitable for use with small munitions due to concerns of weight, drag, manufacturability, flight stability, heat transfer, and other factors.

SUMMARY OF THE INVENTION

The present invention addresses many of the challenges of a conventional motor having a conventional nozzle, such as a conical or bell nozzle. A rocket motor is provided for use with a relatively small projectile. The rocket motor may be a standalone retrofit assembly for addition to conventional projectiles such as mortar rounds, rail gun projectiles, small UAV projectiles, Excalibur munitions, smart munitions, and other mini-munitions having limited length. The rocket motor includes a rear casing portion and a forward casing portion for containing propellant. The rear and forward casing portions are jointly configured to define both a combustion chamber therewithin and an expulsion throat for allowing passage of propellant gases from the rocket motor. This construction integrates the propellant, combustion chamber and nozzle, thereby eliminating the length and weight of the conventional combustion chamber and nozzle, and providing for a relatively greater ratio of propulsion power to overall rocket motor mass.

An exemplary projectile having an exemplary rocket motor is provided. The exemplary projectile includes a body and a motor assembly coupled to the body. The motor assembly including a casing closed at a first casing end adjacent the body and open at a second casing end opposite the first casing end, an inverse nozzle coupled to the casing and received in the second casing end, a propellant charge disposed both in the inverse nozzle and in the casing, and a combustion chamber disposed between the propellant charge and the first casing end, wherein the projectile has a length to diameter ratio of less than or equal to 5.

The projectile may have a length to diameter ratio between and including 0.5 and 5.

A portion of the combustion chamber may be disposed radially inwardly of the propellant, the inverse nozzle, and the casing.

A full open end of the inverse nozzle may be spaced from the second casing end of the casing.

The casing and the inverse nozzle may be coupled via a connection member extending between the casing and the inverse nozzle.

The connection member may extend axially parallel to a center longitudinal motor axis of the motor assembly.

The propellant may be a single integral body.

The propellant may be case-bonded to each of the inverted nozzle and the casing.

Another exemplary projectile includes a forward body and a motor assembly extending along a longitudinal motor axis between a first motor end coupled to the forward body and a second motor end opposite the first motor end. The motor assembly includes a casing closed at a first casing end adjacent the body and open about the longitudinal motor axis at a second casing end opposite the first casing end, an inverse nozzle coupled to the casing and extending along the longitudinal motor axis between an open lead end and a closed tail end opposing the lead end, the lead end being open about the longitudinal motor axis and being received by the second casing end of the casing, and the inverse nozzle tapering outwardly in a direction from the tail end to the lead end, a propellant charge axially disposed between the tail end of the inverse nozzle and the first casing end of the casing, and a combustion chamber axially disposed between the propellant charge and the first casing end of the casing.

In a width dimension perpendicular to the longitudinal motor axis, at least a portion of the combustion chamber may be disposed between opposing propellant walls.

A portion of the combustion chamber may be disposed radially inwardly of the propellant, the inverse nozzle, and the casing.

A throat gap for allowing expulsion of combustion gases may be disposed between the lead end of the inverse nozzle and the second casing end of the casing.

The full lead end of the inverse nozzle may be spaced from the second casing end of the casing.

The casing and the inverse nozzle may be coupled via a connection member extending between the casing and the inverse nozzle.

The connection member may extend axially parallel to the longitudinal motor axis.

Propellant may be disposed both in the inverted nozzle and in the casing.

The propellant may be a single integral body

The propellant may be case-bonded to each of the inverted nozzle and the casing.

The projectile may have a length to diameter ratio of less than or equal to 5.

An exemplary retrofit motor assembly may be provided for being attached to a projectile. The exemplary motor assembly includes a casing closed at a first casing end adjacent the body and open about the longitudinal motor axis at a second casing end opposite the first casing end, an inverse nozzle coupled to the casing and extending along the longitudinal motor axis between an open lead end and a closed tail end opposing the lead end, the lead end being open about the longitudinal motor axis and being received by the second casing end of the casing, and the inverse nozzle tapering outwardly in a direction from the tail end to the lead end, a propellant charge disposed both in the inverse nozzle and in the casing, and a combustion chamber disposed between the propellant charge and the first casing end.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the disclosure.

DETAILED DESCRIPTION

The present application provides a rocket motor assembly for use with projectiles, such as munitions, having relatively low length to diameter ratios. The motor assembly has an aerospike nozzle and a casing disposed about the aerospike nozzle, where interior aerospike volume contains propellant and where walls of both the cowl of the casing and of the aerospike nozzle jointly define the combustion chamber. This construction provides a rocket motor assembly that is suitable for propelling relatively smaller projectiles, such as where addition of a rocket motor was previously prohibitive due to the length, mass, drag, etc. associated with addition of a conventional rocket motor to the relatively smaller projectiles.

The exemplary rocket motor assembly may be used with newly manufactured projectiles, or existing projectiles may be retrofit for the addition of the exemplary rocket motor assembly. For example, the exemplary rocket motor assembly may be used with relatively smaller projectiles having an overall length to diameter ratio less than or equal to 5, or more particularly between and inclusive of 0.5 and 5, after the addition of the exemplary rocket motor assembly. Suitable projectiles may include missile projectiles, rail gun projectiles, guided projectiles, etc. Other suitable uses may include as a base bleed motor, boost motor, or kick-stage booster motor.

Figure 1:
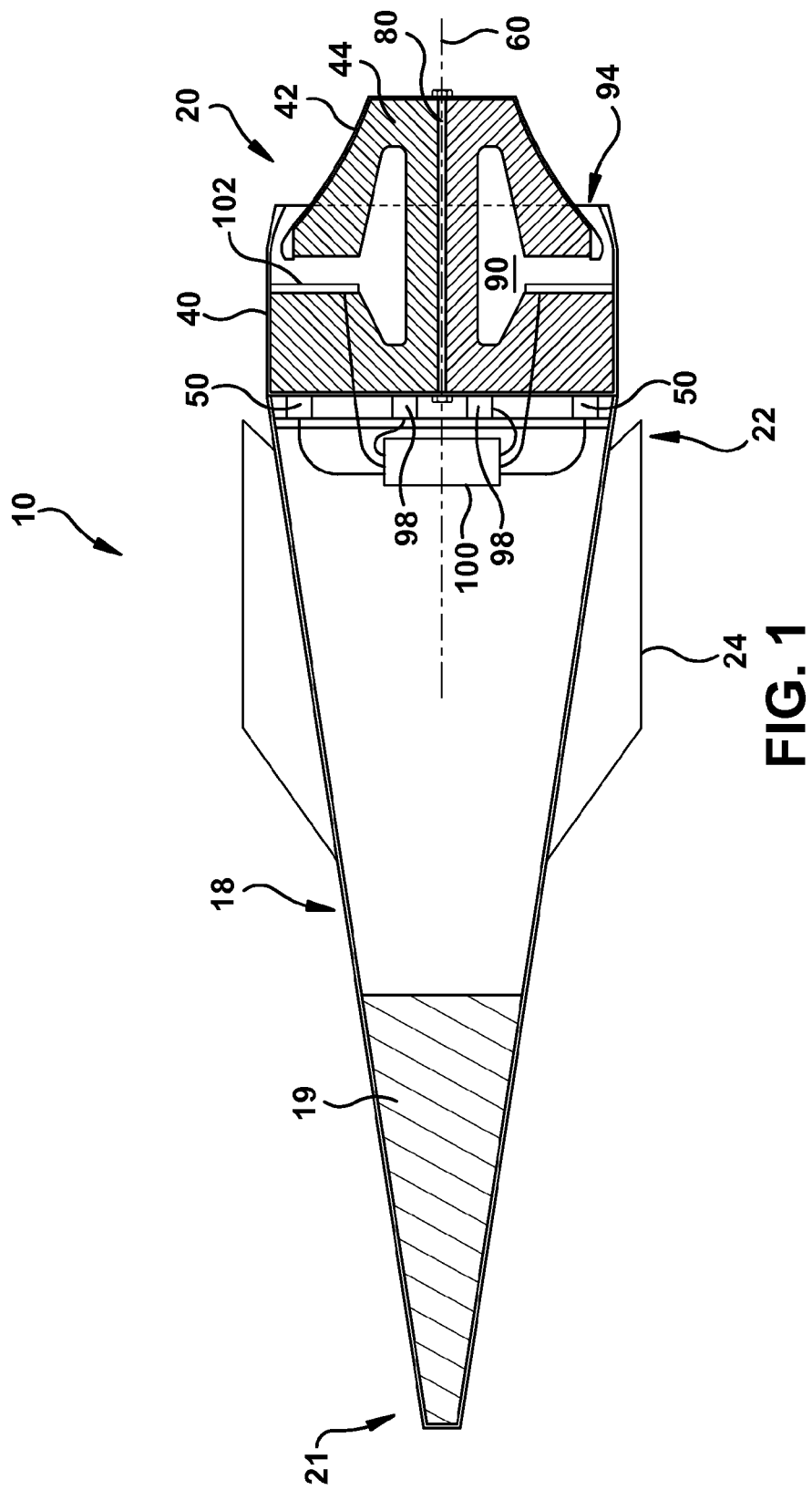
FIG. 1 is a schematic cross-section view of a projectile having a rocket motor in accordance with the invention.
Figure 2:
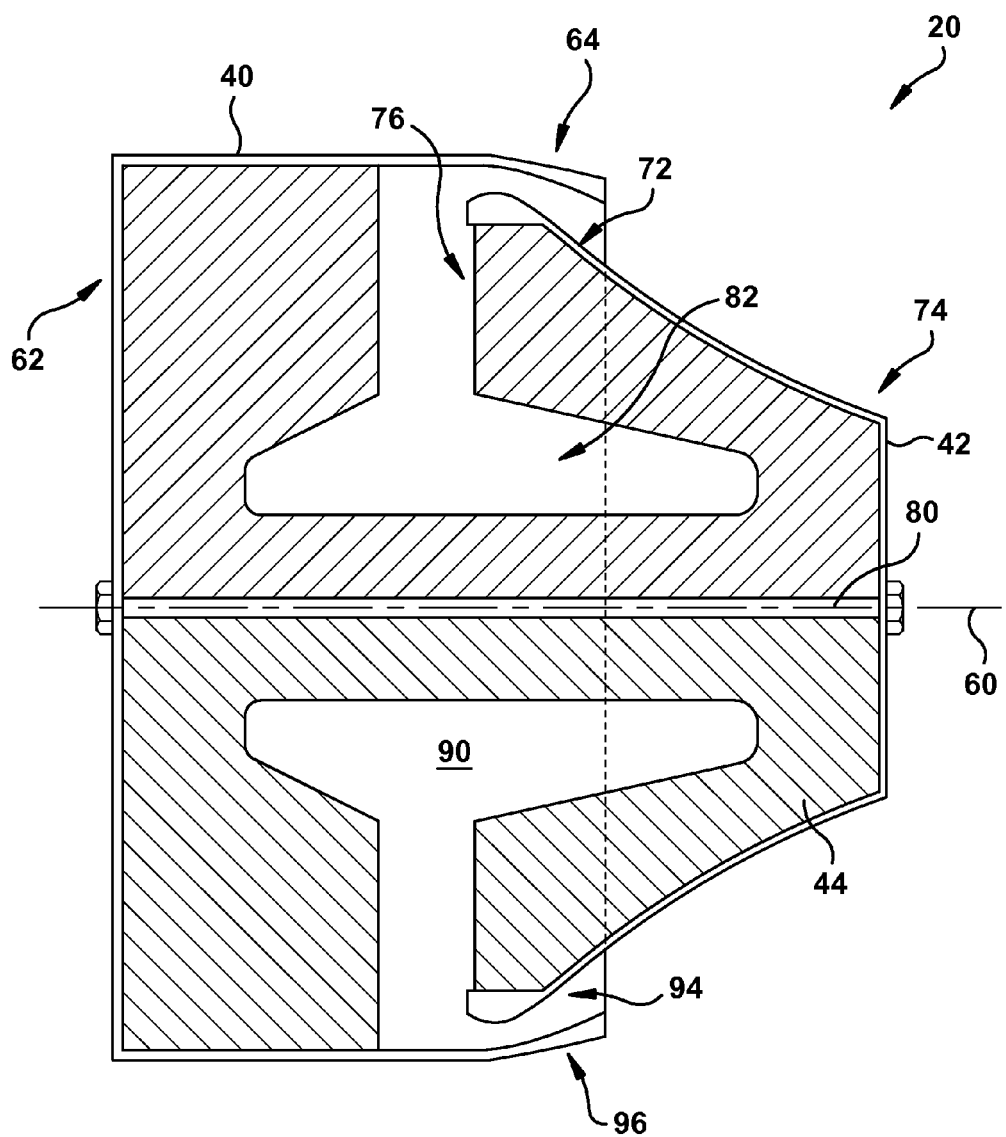
FIG. 2 is a schematic cross-section view of the rocket motor of the projectile of FIG. 1.
Figure 3:
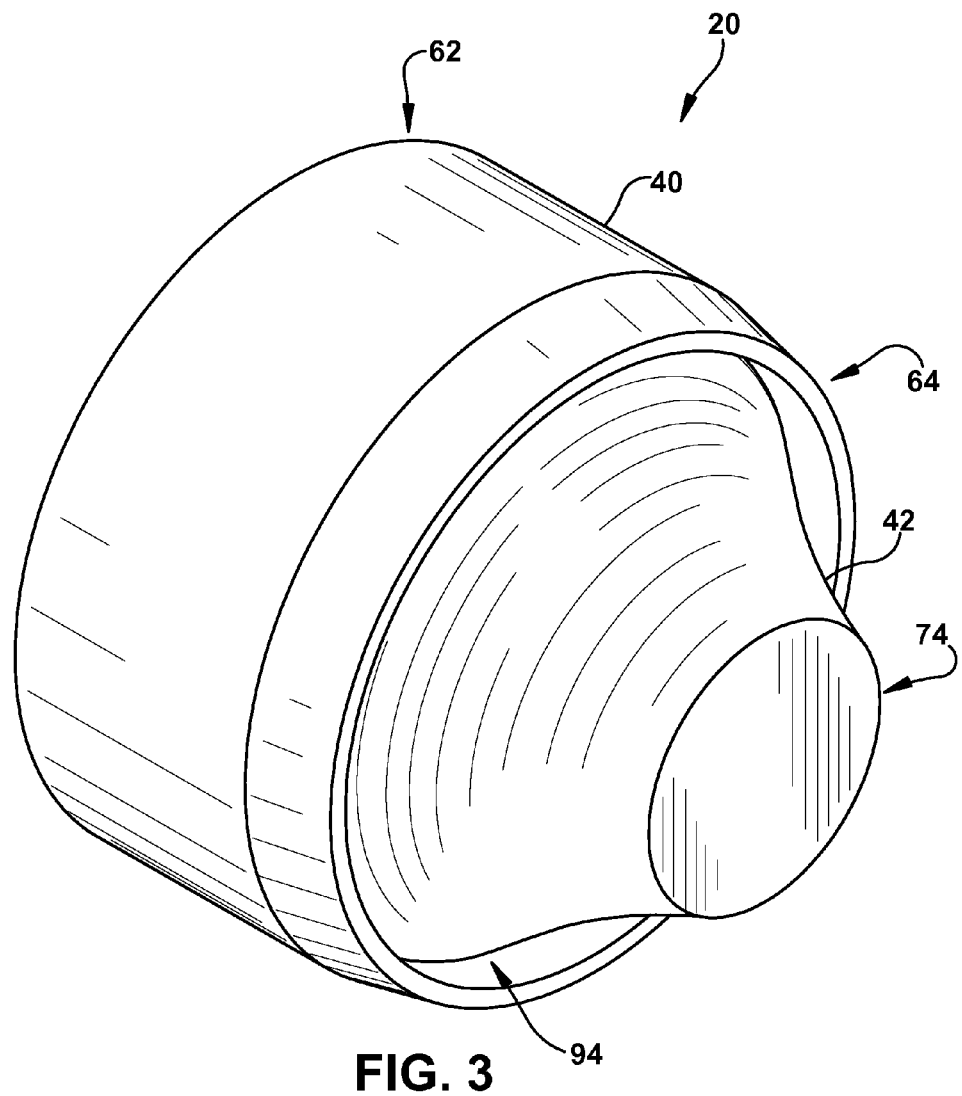
FIG. 3 is an orthogonal view of the rocket motor of the projectile of FIG. 1.

Turning now to FIGS. 1-3, a projectile 10 is shown in schematic view and includes a forward body 18 and a rocket motor assembly 20. The forward body 18 may include a munition 19, such as an explosive. It will of course be appreciated that the forward body 18 may instead include sensor equipment, supplies, etc. The forward body 18 extends between a forward end 21 and a rear end 22. The depicted forward body 18 includes stabilization fins 24.

The rocket motor assembly 20 is coupled to the rear end 22 of the forward body 18 and is provided for generating gases to drive movement of the forward body 18 of the projectile 10 as a whole. The rocket motor assembly 20, also herein referred to as the rocket motor 20, includes a casing 40 and an inverse nozzle 42 that jointly contain propellant 44 for being combusted to produce combustion gases. The inverse nozzle 42 may be referred to as an aerospike nozzle or a plug nozzle. The gases expand within a combustion chamber 90 of the rocket motor 20 and are expelled from the rocket motor 20 to propel the projectile 10. The general construction of the casing 40 and inverse nozzle 42 provides an aerospike motor shape that is useful for flight at numerous altitudes and provides for good altitude compensation, such as when the projectile 10 is caused to rapidly change its flight altitude. The aerospike construction additionally can act to reduce both drag on the projectile 10 and base recirculation about the tail end of the projectile 10.

The rocket motor 20 is generally disposed adjacent the forward body 18, such as being coupled to the rear end 22 of the forward body 18. As used herein, coupling may include direct coupling or indirect coupling. The coupling may be provided via welding, adhesives, bolting, other mechanical interaction, or a combination thereof, for example. In some embodiments, couplers 50 may be provided in the projectile 10 for coupling together the forward body 18 and the rocket motor 20. The couplers 50 may include a latching mechanism or other suitable mechanism for coupling together the forward body 18 and the rocket motor 20.

Turning now to the construction of the rocket motor 20, the casing 40 extends along a center longitudinal motor axis 60 between a forward first casing end 62 and a rear second casing end 64 opposing the first casing end 62. The first casing end 62 is closed and is adjacent the forward body 18, such as being coupled to the rear end 22 of the forward body 18 as illustrated in the embodiment of FIG. 1. The coupling may be provided via welding, adhesives, bolting, other mechanical interaction, or a combination thereof, for example. The second casing end 64 has an opening disposed about the longitudinal motor axis 60 for at least partially receiving the inverse nozzle 42, such as being centrally disposed about the axis 60. The casing 40 is depicted as being generally cylindrical, though the casing 40 may be linear in other embodiments.

The inverse nozzle 42 at least partially received by the casing 40 extends along the longitudinal motor axis 60 between an open lead end 72 and a closed tail end 74 opposing the lead end 72. The opening 76 at the lead end 72 is disposed about the longitudinal motor axis 60, such as centrally disposed about the axis 60. The depicted inverse nozzle 42 is generally frustoconical in shape and tapers outwardly in a direction from the tail end 74 to the lead end 72. The tapering may be non-linear as depicted, although in other embodiments the tapering may be linear and/or the inverse nozzle 42 may have a linear shape. In other embodiments, the inverse nozzle 42 may have a shape other than frustoconical.

The inverse nozzle 42 and the casing 40 are coupled to one another via one or more connection members 80 extending between the inverse nozzle 42 and casing 40. As illustrated, a central connection member 80 extends axially parallel to and collinear with the longitudinal motor axis 60. The connection member 80 is rod-shaped and is coupled, such as via nuts and/or welding to each of the nozzle 42 and casing 40. In other embodiments, the nozzle 42 and casing 40 may be coupled via welding, adhesives, bolting, etc.

The connection member 80 enables the tail end 74 of the inverse nozzle 42 to be spaced from the forward casing end 62 defining a rocket motor interior 82 therebetween. The rocket motor interior 82 is shaped to contain the propellant 44 and to provide space for combustion of the propellant 44.

The propellant 44 is provided for being ignited and combusted to generate high pressure gases for being used to propel or move the projectile 10. The propellant 44, also herein referred to as a propellant charge 44, is depicted as a solid, single integral body, though the charge may be provided in any shape or form, not limited to rods, pellets, grain, etc. The propellant charge 44 may be made from any suitable material or materials, including fuels, oxidizers, binders, plasticizers, metallic additives, etc. In other embodiments, two or more propellant charges may be included and may contain differing compositions.

The propellant charge 44 is disposed in each of the nozzle 42 and casing 40, and in particular is disposed between the tail end 74 of the inverse nozzle 42 and the first casing end 62 of the casing 40. The propellant 44 may be coupled to one or both of the nozzle 42 or casing 40. As shown, the propellant charge 44 is case-bonded to inner walls of both the casing 40 and the nozzle 42. In other embodiments, the propellant charge 44 may be cast separately from the nozzle 42 and casing 40 and then placed into or bonded into the nozzle 42 and casing 40.

The propellant charge 44 is shaped to aid in initially defining a combustion chamber 90 for the expansion of propellant gases. The propellant 44 may have any suitable shape, such as being formed via additive manufacturing. The illustrated geometry of the propellant 44 is shaped to maximize a ratio of exposed propellant surface area and combustion chamber volume.

In the embodiment of FIGS. 1-3, the propellant charge 44, the casing 40, and the nozzle 42 each at least partially define the combustion chamber 90. Axially, the combustion chamber 90 is disposed between portions of the propellant charge 44, or more generally between the propellant charge 44 and the first casing end 62. In a width dimension perpendicular to the longitudinal motor axis 60, such as along a diameter of the rocket motor 20, at least a portion of the combustion chamber 90 is disposed between opposing walls of propellant 44. Accordingly, a portion of the combustion chamber 90 is disposed radially inwardly of the propellant 44, and also radially inwardly of the inverse nozzle 42 and the casing 40.

The nozzle 42 and casing 40 also radially define therebetween a throat 94 that is in fluid communication with the combustion chamber 90. As used herein, fluid communication may include gaseous communication, liquid communication, or a combination thereof. The throat 94, also herein referred to as a throat gap or nozzle throat, is shaped to allow for expulsion of propellant gases from the combustion chamber 90 for driving the projectile 10. The throat 94 is relatively small in area compared to the combustion chamber 90 for choking expelled propellant gases to increase their velocity during expulsion from the combustion chamber 90. As shown, the throat 94 is defined between the lead end 72 of the inverse nozzle 42 and the second casing end 64 of the casing. The forward most edge of the lead end 72, and for example the full circumference of the forward most edge, is radially inwardly spaced from the casing 40.

Walls of each of the nozzle 42 and the casing 40, for example the casing cowling portion 96, define the combustion chamber 90, maximizing use of nozzle volume. Furthermore, the propellant 44 is configured, such as being shaped to also at least partially define the combustion chamber 90. Interior space of the nozzle 42 is used both for providing a combustion chamber 90 and for storing propellant 44, rather than remaining as unutilized space. It follows that the rocket motor 20 has a relatively high loading density such that there is a greater propellant mass per given volumetric unit of the rocket motor 20.

It will also be appreciated that via efficient use of internal volume of the rocket motor 20 and via the unique construction of the rocket motor 20, the rocket motor 20 is provided having a high mass fraction. Thus more propellant 44 is provided and total volume of the rocket motor 20 is minimized, including minimizing the overall length of the rocket motor 20. For example, the projectile 10, including both the forward body 18 and the rocket motor assembly 20, has a length to diameter ratio of less than or equal to 5.0, or more particularly of between 0.5 and 5.0. Thus the rocket motor assembly is suitable for many small projectile bodies where use of a rocket motor has been prohibitive or has been omitted altogether due to concerns of length, size, mass, drag, etc.

Turning now to additional features of the rocket motor 20, the motor 20 may be configured to be separable from the forward body 18. For example, where the couplers 50 include a latching mechanism, the latching mechanism may allow for separation of the rocket motor 20 from the forward body 18, such as during flight of the projectile 10. Additionally or alternatively, a separate mechanism being mechanical, chemical, electrical, or any combination thereof, may be included for separating the rocket motor 20 from the forward body 18. The separate mechanism may include pyrotechnics 98 disposed between the rear end 22 of the forward body 18 and the casing 40, for example.

The projectile 10 also may include a controller 100 communicatively connected to the couplers 50 and to the pyrotechnics 98. The controller 100 may be autonomous or may be controlled wirelessly. The controller 100 or a separate controller may provide for the activation of an igniter 102 for initiating combustion of the propellant 44 via communicative connection between an igniter 102 and the controller 100 or separate controller.

Referring now to FIGS. 2 and 3, the rocket motor assembly 20 of the projectile 10 is shown separate from the forward body 18. The rocket motor assembly 20 may be provided as a retrofit assembly for being added to existing projectiles or partial projectiles. As depicted, the motor assembly 20 may be generally round, or in other embodiments the motor assembly 20 may be rectilinear or of other suitable shape.

Figure 4:
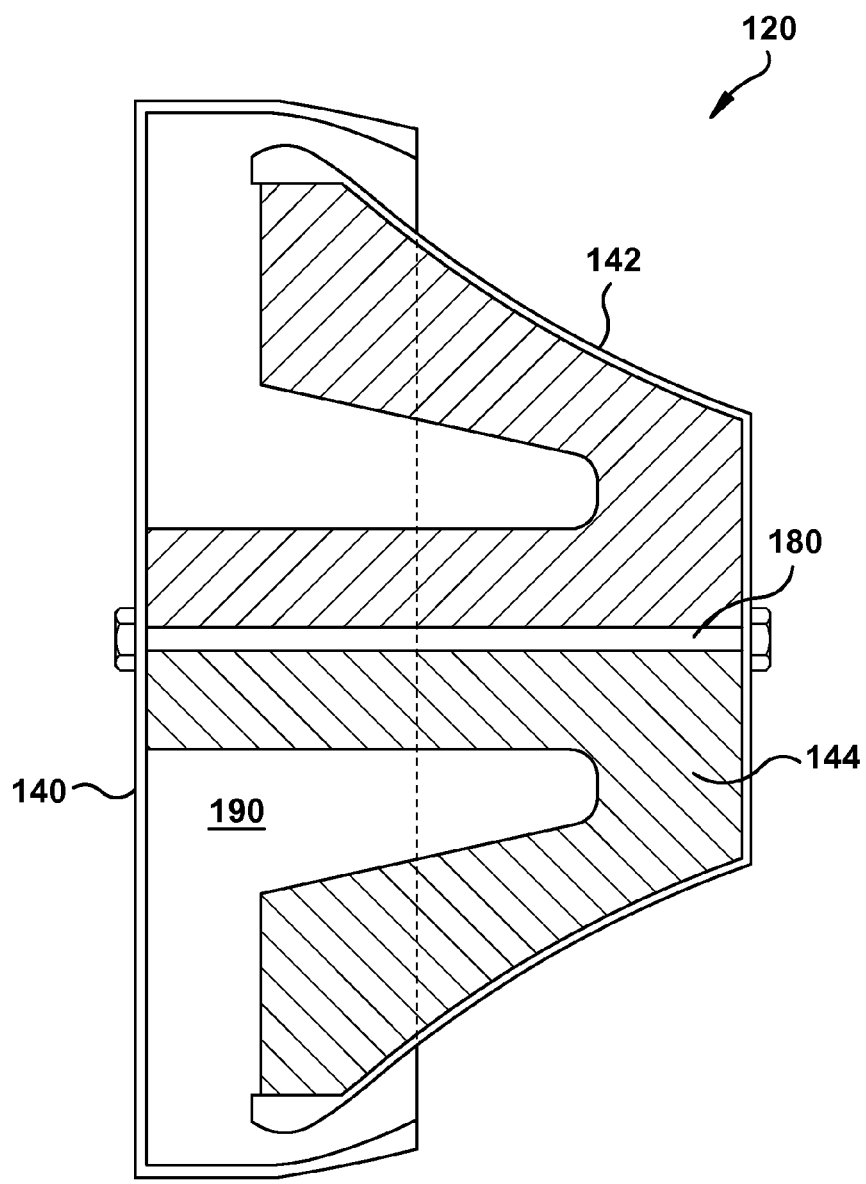
FIG. 4 is a schematic cross-section view of another rocket motor in accordance with the invention.

Turning now to FIG. 4, a rocket motor assembly 120 is depicted that is similar to the rocket motor assembly 20. The above discussion with respect to FIGS. 1-3 applies to the embodiment of FIG. 4 except as otherwise differentiated. The rocket motor 120 includes a casing 140, nozzle 142 and propellant 144 that define a combustion chamber 190. The propellant 144 has a shape different from the propellant 44 of the rocket motor assembly 20, and thus provides a combustion chamber 190 having a larger area than that of the combustion chamber 90 of the rocket motor assembly 20.

Figure 5:
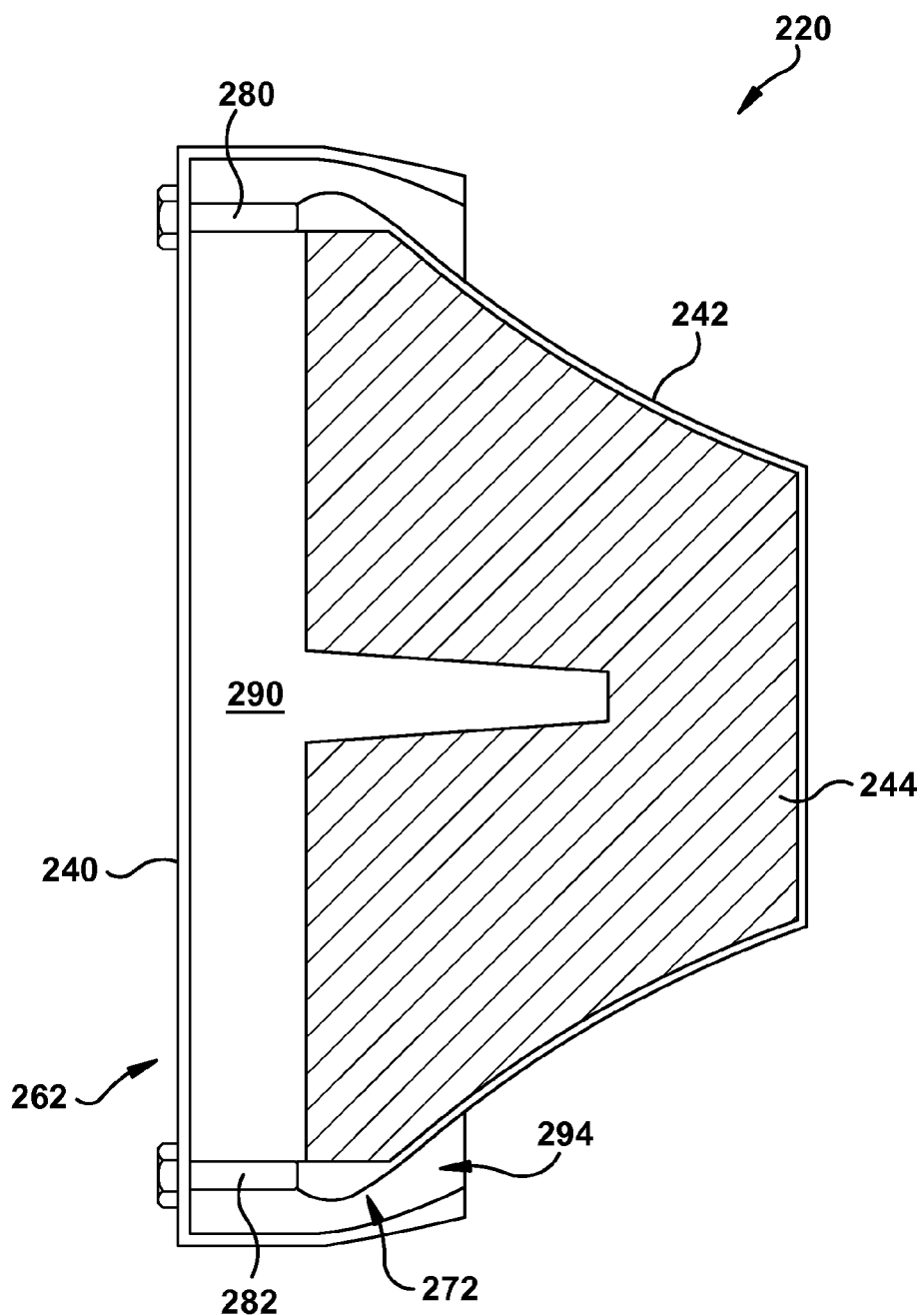
FIG. 5 is a schematic cross-section view of yet another rocket motor in accordance with the invention.
Figure 6:
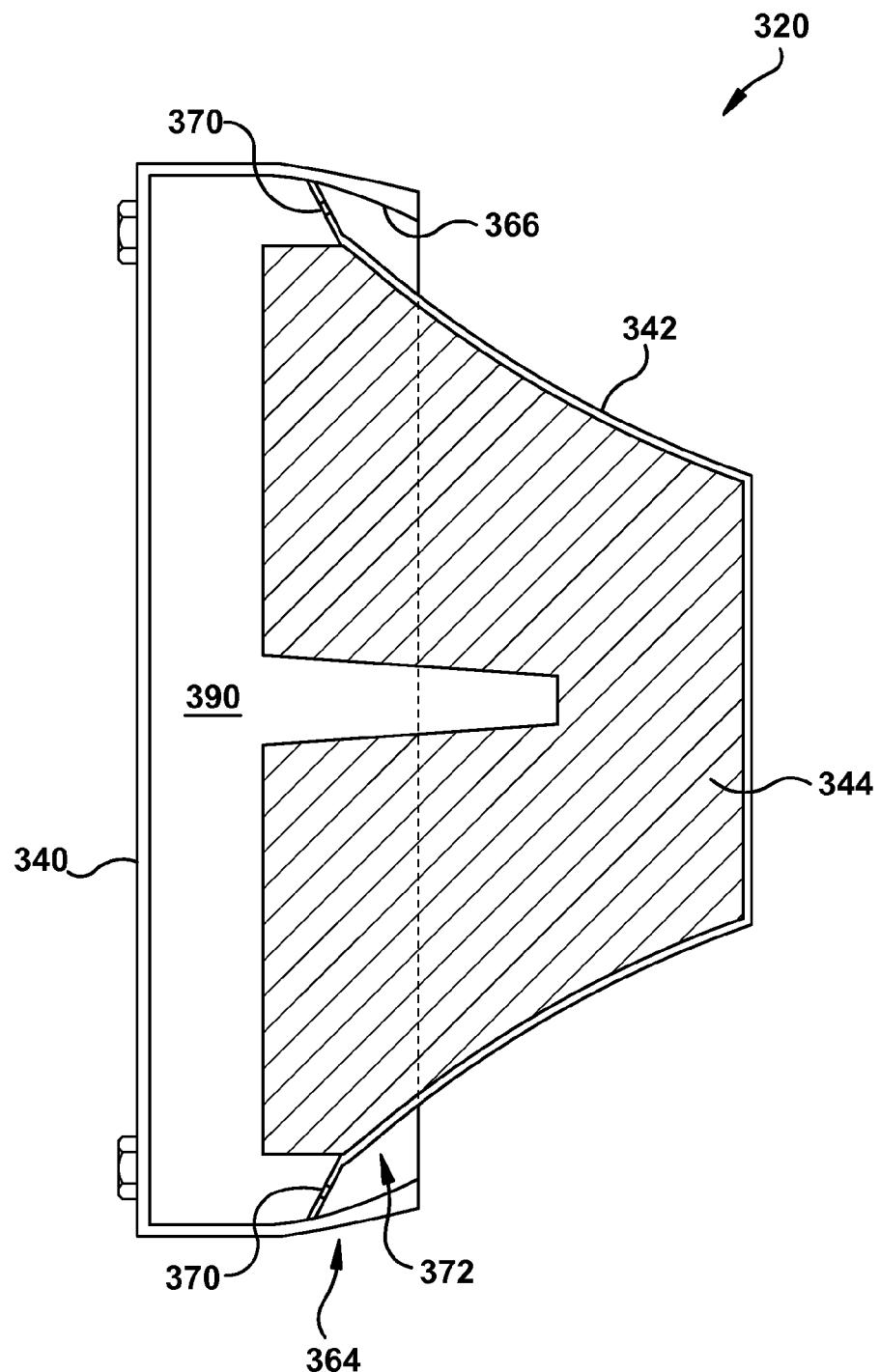
FIG. 6 is a schematic cross-section view of still another rocket motor in accordance with the invention.

Turning now to FIGS. 5 and 6, additional embodiments of rocket motor assemblies are shown in accordance with the present invention. The above discussion with respect to FIGS. 1-3 applies to the embodiments of FIGS. 5 and 6 except as otherwise differentiated.

FIG. 5 depicts a rocket motor assembly 220 including a casing 240, nozzle 242 and propellant 244 that define a combustion chamber 290. The rocket motor assembly 220 has two connection members 280 connecting the casing 240 and nozzle 242. The connection members 280 extend between the lead end 272 of the nozzle 242 and the first casing end 262 of the casing 240. A throat 294 is provided radially outward of the lead end 272 and radially inward of the second casing end 264 of the casing 240.

FIG. 6 depicts a rocket motor assembly 320 including a casing 340, nozzle 342 and propellant 344 that define a combustion chamber 390, and that omits connection members. Rather the lead end 372 of the nozzle 342 is connected to an internal wall of the second casing end 364 of the casing 340. As depicted the nozzle 342 is welded to an interior surface 366 of the casing 340. Expulsion orifices, such as expulsion holes 370, extend through the lead end 372 of the nozzle 342 for allowing passage of propellant cases from the combustion chamber 390 to an external environment. The depicted expulsion holes 370 are circumferentially disposed about the lead end 372, such as being equally circumferentially separated.

In summary, a motor assembly 20, 120, 220, 320 is provided for use with projectiles, such as munitions, having relatively low length to diameter ratios. The motor assembly 20, 120, 220, 320 has an aerospike nozzle 42, 142, 242, 342 and a casing 40 disposed about the aerospike nozzle 42, 142, 242, 342, where interior aerospike volume contains propellant 44, 144, 244, 244 and where walls of both the cowl of the casing 40, 140, 240, 340 and of the aerospike nozzle 42, 142, 242, 342 jointly define a combustion chamber 90, 190, 290, 390.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A projectile comprising:
a body; and
a motor assembly coupled to the body, the motor assembly including
a casing closed at a first casing end adjacent the body and open at a second casing end opposite the first casing end,
an inverse nozzle coupled to the casing and received in the second casing end,
a propellant charge disposed both in the inverse nozzle and in the casing, and
a combustion chamber disposed between the propellant charge and the first casing end, and
a throat gap formed by the casing and the inverse nozzle, wherein the throat gap has a fixed size and is configured to allow for expulsion of propellant gases between the casing and the inverse nozzle from the combustion chamber for driving the projectile, wherein the projectile has a length to diameter ratio of greater than 0 and less than or equal to 5, and wherein the inverse nozzle and the propellant charge extend beyond the second casing end away from the first casing end.

2. The projectile of claim 1, wherein the length to diameter ratio of the projectile is between and including 0.5 and 5.

3. The projectile of claim 1, wherein a portion of the combustion chamber is disposed radially inwardly of the propellant charge, the inverse nozzle, and the casing.

4. The projectile of claim 1, wherein a full open end of the inverse nozzle is spaced from the second casing end of the casing.

5. The projectile of claim 1, wherein the casing and the inverse nozzle are coupled via a connection member extending between the casing and the inverse nozzle.

6. The projectile of claim 5, wherein the connection member extends axially parallel to a center longitudinal motor axis of the motor assembly.

7. The projectile of claim 1, wherein the propellant charge is a single integral body.

8. The projectile of claim 1, wherein the propellant charge is case-bonded to each of the inverse nozzle and the casing.

9. A projectile comprising:
a forward body; and
a motor assembly extending along a longitudinal motor axis between a first motor end coupled to the forward body and a second motor end opposite the first motor end, the motor assembly including
a casing closed at a first casing end adjacent the forward body and open about the longitudinal motor axis at a second casing end opposite the first casing end,
an inverse nozzle coupled to the casing and extending along the longitudinal motor axis between an open lead end and a closed tail end opposing the open lead end, the open lead end being open about the longitudinal motor axis and being received by the second casing end of the casing, and the inverse nozzle tapering outwardly in a direction from the closed tail end to the open lead end,
a single propellant charge is axially disposed between the closed tail end of the inverse nozzle and the first casing end of the casing, wherein the single propellant charge abuts a surface of the casing and extends continuously from within the inverse nozzle to the surface, and
a combustion chamber axially disposed between the single propellant charge and the first casing end of the casing.

10. The projectile of claim 9, wherein in a width dimension perpendicular to the longitudinal motor axis, at least a portion of the combustion chamber is disposed between opposing propellant walls.

11. The projectile of claim 9, wherein a portion of the combustion chamber is disposed radially inwardly of the single propellant charge, the inverse nozzle, and the casing.

12. The projectile of claim 9, wherein a throat gap for allowing expulsion of combustion gases is disposed between the open lead end of the inverse nozzle and the second casing end of the casing.

13. The projectile of claim 9, wherein the entire open lead end of the inverse nozzle is spaced from the second casing end of the casing.

14. The projectile of claim 9, wherein the casing and the inverse nozzle are coupled via a connection member extending between the casing and the inverse nozzle.

15. The projectile of claim 14, wherein the connection member extends axially parallel to the longitudinal motor axis.

16. The projectile of claim 9, wherein the single propellant charge is disposed both in the inverse nozzle and in the casing.

17. The projectile of claim 9, wherein the single propellant charge is case-bonded to each of the inverse nozzle and the casing.

18. The projectile of claim 9, wherein the projectile has a length to diameter ratio of greater than 0 and less than or equal to 5.

19. A retrofit motor assembly for being attached to a projectile, the motor assembly comprising:
- a casing closed at a first casing end adjacent a body and open about a longitudinal motor axis at a second casing end opposite the first casing end,
- an inverse nozzle coupled to the casing and extending along the longitudinal motor axis between an open lead end and a closed tail end opposing the open lead end, the open lead end being open about the longitudinal motor axis and being received by the second casing end of the casing, and the inverse nozzle tapering outwardly in a direction from the closed tail end to the open lead end,
- a propellant charge disposed both in the inverse nozzle and in the casing, wherein the propellant charge abuts a surface of the casing and extends continuously from within the inverse nozzle to the surface, and
- a combustion chamber disposed between the propellant charge and the first casing end.

20. The retrofit motor assembly of claim 19, wherein the propellant charge is a single integral body.

\* \* \* \* \*